(12) United States Patent
Hamman et al.

(10) Patent No.: US 9,298,431 B2
(45) Date of Patent: Mar. 29, 2016

(54) METHOD OF COMPILATION, COMPUTER PROGRAM AND COMPUTING SYSTEM

(71) Applicants: Emmanuel Hamman, Marcoussis (FR); Stephane De Marchi, Paris (FR)

(72) Inventors: Emmanuel Hamman, Marcoussis (FR); Stephane De Marchi, Paris (FR)

(73) Assignee: SIMPULSE, Palaiseau (FR)

(*) Notice: Subject to any disclaimer, the term of this patent is extended or adjusted under 35 U.S.C. 154(b) by 0 days.

(21) Appl. No.: 14/375,021

(22) PCT Filed: Jan. 27, 2013

(86) PCT No.: PCT/EP2013/051522
§ 371 (c)(1),
(2) Date: Jul. 28, 2014

(87) PCT Pub. No.: WO2013/110801
PCT Pub. Date: Aug. 1, 2013

(65) Prior Publication Data
US 2015/0007152 A1 Jan. 1, 2015

(30) Foreign Application Priority Data
Jan. 27, 2012 (FR) ..................... 12 00247

(51) Int. Cl.
*G06F 9/45* (2006.01)
(52) U.S. Cl.
CPC *G06F 8/41* (2013.01); *G06F 8/423* (2013.01); *G06F 8/441* (2013.01); *G06F 8/4435* (2013.01); *G06F 8/4441* (2013.01); *G06F 8/51* (2013.01)

(58) Field of Classification Search
USPC ........................................................ 717/146
See application file for complete search history.

(56) References Cited

U.S. PATENT DOCUMENTS

| | | | |
|---|---|---|---|
| 8,732,680 B2 * | 5/2014 | Barik et al. | 717/140 |
| 8,826,256 B2 * | 9/2014 | Doyle et al. | 717/156 |
| 2001/0044930 A1 * | 11/2001 | Miyata et al. | 717/9 |
| 2002/0100031 A1 * | 7/2002 | Miranda et al. | 717/152 |
| 2011/0055819 A1 * | 3/2011 | Doyle et al. | 717/156 |
| 2012/0151458 A1 * | 6/2012 | Ohrstrom | 717/148 |

(Continued)

OTHER PUBLICATIONS

Pramod G Joisha et al.: "A translator system for the MATLAB language", Software Practice & Experience Wiley & Sons. Bognor Regis. GB, vol. 37. No. 5. Apr. 25, 2007 • pp. 535-578, XP007913908, ISSN: 0038-0644. 001: 10.1002/SPE.781 [retrieved on Nov. 2, 2006] abstract, p. 535. paragraph 1-p. 542. last paragraph; figures 4.5 p. 545, paragraph 1-p. 551, paragraph 3.• figure 8 p. 552. paragraph 1-p. 557.

(Continued)

*Primary Examiner* — Marina Lee
(74) *Attorney, Agent, or Firm* — Young & Thompson

(57) ABSTRACT

The method includes:—pre-compiling a source code including determining (212), in the source code, the presence of one or a plurality of array computations on one or a plurality of arrays, referred to as input arrays, the result whereof is assigned to an array, referred to as a result array, and modifying (214) the source code according to the array computation(s) for which the presence has been determined; and—compiling (238) the modified source in machine code intended to be executed by a computer system, referred to as a target computer system, having a processor, the compiling (238) of the modified source code including compiling the command instructions in instructions which, when executed by the processor of the target computer system, command a specialized electronic device, different from the processor, to carry out each array computation detected.

15 Claims, 3 Drawing Sheets

(56) References Cited

U.S. PATENT DOCUMENTS

Figure 2A:
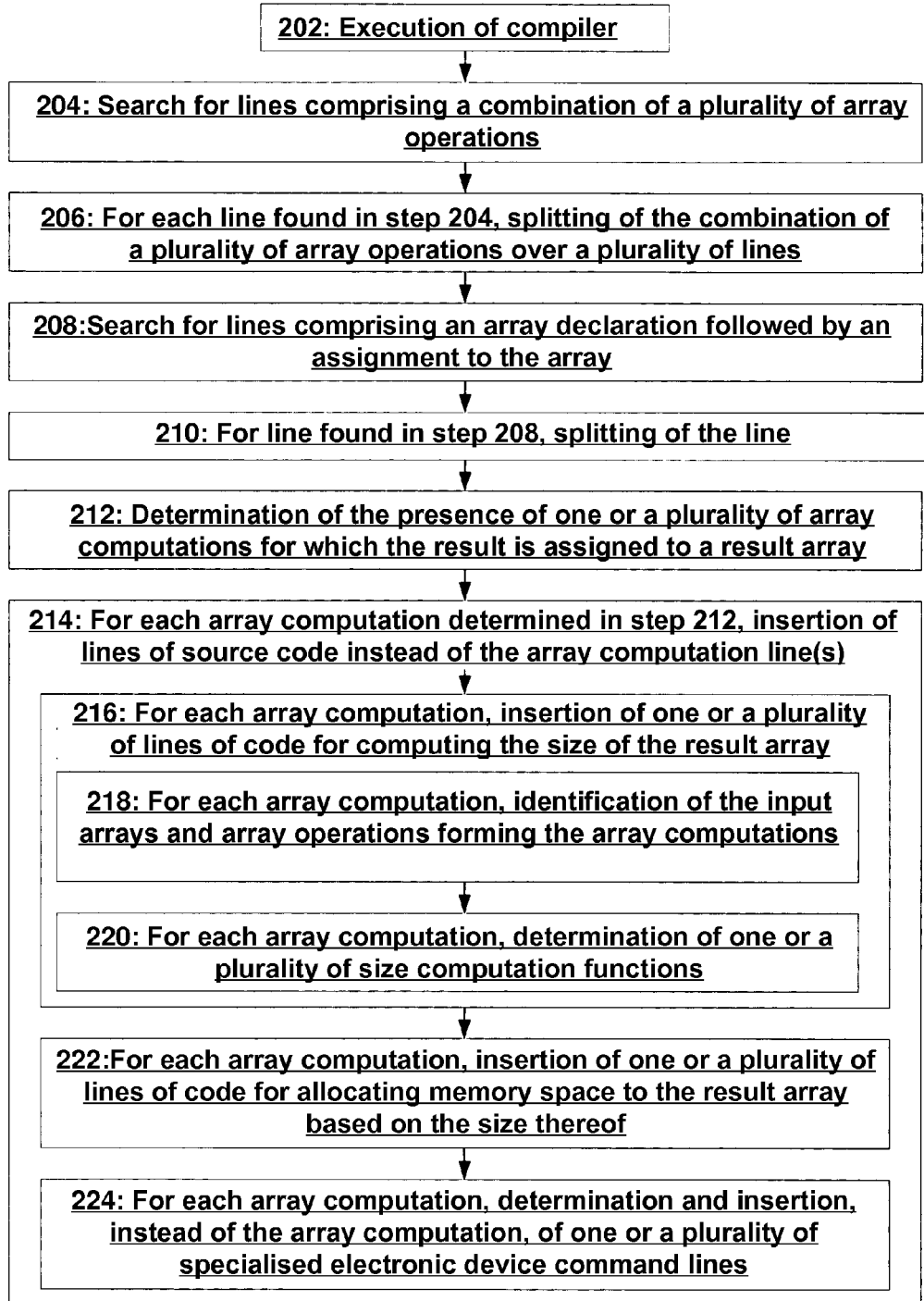

2014/0331215 A1* 11/2014 Bowler et al. ............... 717/151
2014/0344794 A1* 11/2014 Doyle et al. ................ 717/156
2015/0006842 A1* 1/2015 De Marchi et al. ........... 711/167
2015/0007152 A1* 1/2015 Hamman et al. ............. 717/146

OTHER PUBLICATIONS

Pramod G Joisha et al.: "A translator system for the MATLAB language", Software Practice & Experience Wiley & Sons. Bognor Regis. GB, vol. 37. No. 5. Apr. 25, 2007 • pp. 535-578, XP007913908, ISSN: 0038-0644. 001: 10.1002/SPE.781 [retrieved on Nov. 2, 2006] abstract, p. 535. paragraph 1-p. 542. last paragraph; figures 4.5 p. 545, paragraph 1-p. 551, paragraph 3· • figure 8 p. 552. paragraph 1-p. 557. paragraph 2· • figures 12-18 p. 564. paragraph 7-p. 566. paragraph 1.

Ashwin Prasad et al.: "Automatic compilation of MATLAB programs for synergistic execution on heterogeneous processors", Proceedings of the 2011 ACM SIGPLAN Conference on Programming Language Design and Implementation. PLDI '11, vol. 46. Jun. 2011, p. 152-163. XP055039434, New York. ISSN: 0362-1340. DOI: 10.1145/1993498.1993517 ISBN: 978-1-60-558392-1 abstract p. 152. right-hand column. para. 3-p.152. right-hand column. last para. p. 153. right-hand column. last para.-p. 160. right-hand column, para. 2; fig. 1.

Daniel McFarlin et al.: "Library Function Selection in Compiling Octave", Parallel and Distributed Processing Symposium. 2007. IPDPS 2007. IEEE International. IEEE. PI. Mar. 26-Mar. 30, 2007. pp. 1-8. XP031175680, ISBN: 978-1-4244-0909-9 abstract p. 1. left-hand column. paragraph 1-p. 1. right-hand column. paragraph 3 p. 2. left-hand column. paragraph 4-p. 5. right-hand column. last paragraph.

Cichon G et al.: "SAMIRA: A SIMD-DSP architecture targeted to the Matlab source language", Proceedings of the Global Signal Processing Expo and Conference. XX. XX, Sep. 28, 2004, XP002380035, abstract p. 1. left-hand column. paragraph 2-p. 1. right-hand column. paragraph 5 p. 2. right-hand column. paragraph 5-p. 4. left-hand column. paragraph 5.

Marsolf B et al.: "The interactive restructuring of MATLAB programs using the FALCON environment", Innovative Architecture for Future Generation High-Performance Processors and Systems, 1997 Maui, HI, USA Oct. 22-24, 1997, Los Alamitos, CA, USA,IEEE Comput. Soc, US, Oct. 22, 1997, pp. 3-12, XP010275875, ISBN: 978-0-8186-8424-1 abstract p. 5, left-hand column, paragraph 3-p. II, right-hand column, paragraph 1; figure 1.

International Search Report, dated Apr. 18, 2013, from corresponding PCT application.

* cited by examiner

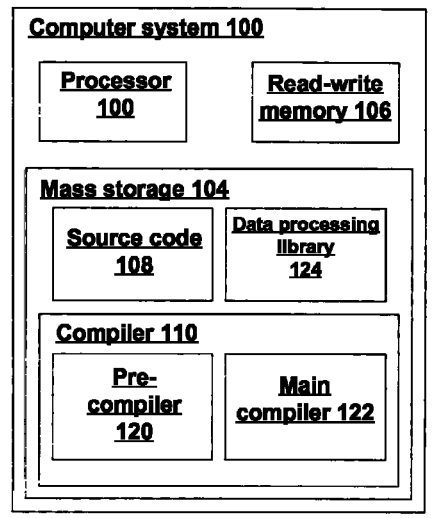
Figure 1
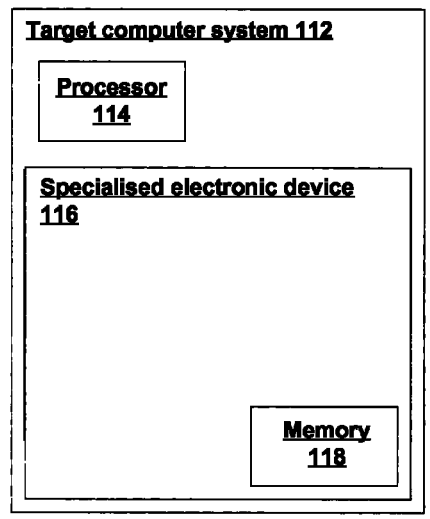

METHOD OF COMPILATION, COMPUTER PROGRAM AND COMPUTING SYSTEM

BACKGROUND OF THE INVENTION

1. Field of the Invention

The present invention relates to a compiling method, a computer program and a computer system.

2. Description of the Related Art

In the description and claims hereinafter, the following terminology will be used.

A line of code, hereinafter merely referred to as a "line", is a combination of functions and/or variables and/or constants to be evaluated according to function evaluation priority rules.

A function is a set of instructions which, during the execution thereof by a processor, carry out one or more actions. A function may wait for no, one or more arguments and return no or one result.

A variable is a computing object intended to contain data. A variable comprises a name and is intended to contain a certain type of data. In this way, an array type variable is a variable intended to contain an array. Hereinafter, a variable will merely be denoted by the type thereof, such that an "array" will denote "an array type variable".

A block of code is the set of one or a plurality of successive or separate lines.

Simplifying the code means reducing the number of functions and/or variables contained in the code, without changing the end result of the code execution.

Assigning an array to an array type variable means saving the array in the variable.

Allocating a value means defining a memory space intended to contain the variable data.

An array operation is a function having at least one array as an argument and/or returning an array type result.

An array expression is a finite and syntactically correct combination of symbols, a portion whereof represents array operations, and a further portion whereof represents arrays.

An array computation consists of a single operation or a plurality of combined array operations on a single line or distributed over a plurality of lines.

Compiling is the operation converting a source code written in a programming language into a sequence of instructions which are specific to a processor, referred to as machine code. Compiling quality is measured according to the size of the machine code obtained (the smallest possible to save memory) and/or the code execution speed on the target processor (as fast as possible to process as many tasks as possible).

The programming language may be general such as C or C++ language, i.e. it is suitable for describing numerous types of processing operation. However, in many fields, other more specialised languages are preferred, since they enable a more concise and more natural description. In signal processing, the language Matlab (registered trademark) is frequently used. Furthermore, C++ libraries are available providing a similar syntax to that of Matlab.

In C++ language, an array is presented in table form.

Moreover, libraries are available supplying a type of data intended to represent an array.

SUMMARY OF THE INVENTION

The aim of the invention is that of making it possible to optimise a program using arrays.

For this purpose, a compiling method is proposed.

By means of the invention, the source code may be optimised automatically for carrying out array computations by the specialised computer system. The programmer thus does not need to be concerned with the method used for writing array computations, and does not even particularly need to know the array computations for which the computer system is specialised.

Optionally, modifying the source code comprises:—determining, for each array computation for which the presence has been determined, one or a plurality of lines of code, referred to as size computation lines, intended to be compiled in instructions which, when executed by a processor, compute the dimensions of the result array based on at least one of the dimensions of at least one input array.

Indeed, in C, the size of an array is generally indicated during the array declaration. For example, the line int M [5][5]; declares an array M of integers having five rows and five columns. In the case of a C++ library defining an "array" data type in the form of a class, it is however known that this type of data does not require an indication of the size of the array during the declaration thereof.

However, in any case, during compiling, the compiler, on encountering an array declaration in the source code, introduces in the machine code a call for an initialisation function, referred to as constructor and defined in the library at the same time as the array data type. The constructor comprises lines for computing the size of the array in order to allocate sufficient memory space thereto.

However, this compiling method involves the problem that each declaration of an array will give rise to the appearance in the machine code of a call for the constructor, which will thus be executed whenever the compiled program (the machine code) is executed. Consequently, the lines for computing the size of the array will also be executed for each array declaration, without the possibility of exercising any control over the interest of these lines in the context of the compiled program.

On the other hand, in this embodiment of the invention, the size computation appears in the source code, before it is compiled, i.e. converted into machine code. In this way, it is possible to perform all kinds of operations on these lines before compiling, in particular code optimisation operations.

Also optionally, modifying the source code comprises:—determining, for each array computation for which the presence has been determined, one or a plurality of lines of code, referred to as allocation lines, intended to be compiled in instructions which, when executed by a processor, allocate a memory space to the result array based on the dimensions of the result array computed.

Also optionally, pre-compiling further comprises:—simplifying the lines determined to reduce the number of functions and/or variables present in these lines; the simplified lines being inserted in the source code.

Also optionally, simplifying the lines comprises:—determining, in the lines, the assigning of the same expression to two different variables;—removing the assignment of a first of the two variables and replacing, in the lines, the first variable by the second of the two variables.

Also optionally, simplifying the lines comprises:—determining the presence, in the size computation line(s), of a combination of calls of function of at least one dimension of at least one input array;—simplifying the combination of function calls based on predefined rules for simplifying function call combinations.

Also optionally, a memory space for the result array is allocated in a memory of the specialised electronic device, the latter being intended to write the result of the array computation in the allocated memory space.

A computer program comprising instructions which, when executed by a computer system processor, give rise to the implementation of a compiling method according to the invention, is further proposed.

A computer system comprising:—a processor;—a read-write memory; and—mass storage wherein a computer program according to the invention is saved, intended to be loaded in the read-write memory to be executed by the processor, is further proposed.

BRIEF DESCRIPTION OF THE DRAWING FIGURES

Figure 2B:
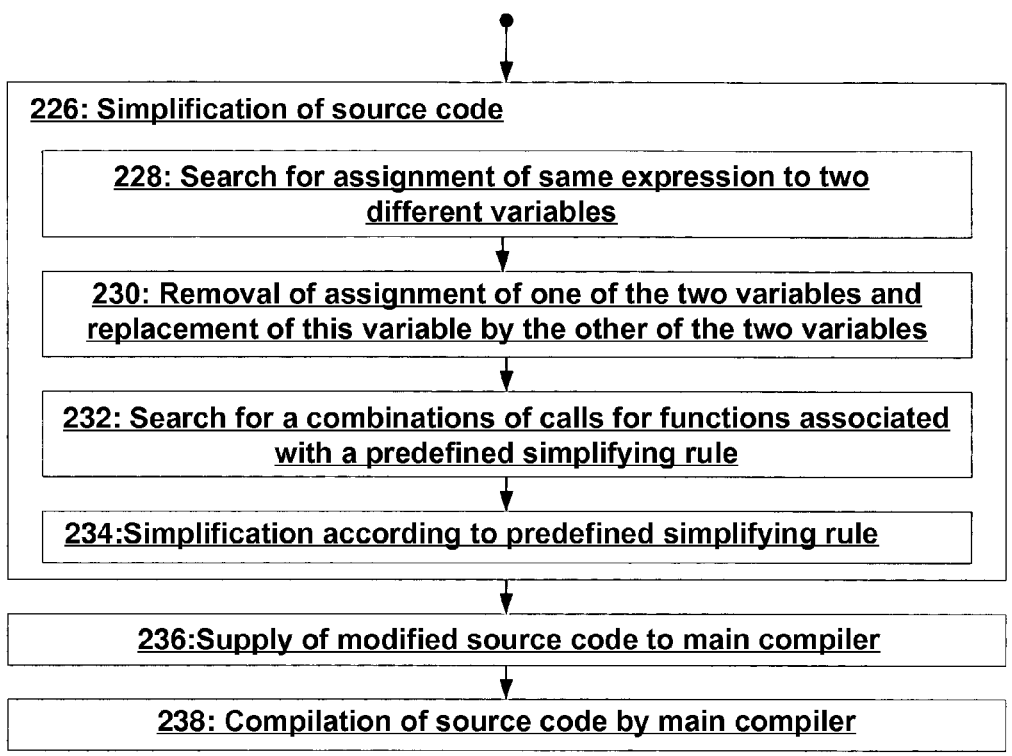

An example of implementation of the invention will now be described with reference to the following figures:

FIG. 1 is a schematic view of a compiling computer system and a target computer system according to the invention, FIG. 2, split into FIGS. 2A and 2B, is a block diagram of a compiling method according to the invention implemented by the computer system in FIG. 1.

DETAILED DESCRIPTION OF THE INVENTION

With reference to FIG. 1, an example of a compiling computer system 100 according to the invention is described hereinafter.

The computer system 100 firstly comprises a processor 102.

The computer system 100 further comprises mass storage 104. The mass storage 104 is preferably non-volatile. It consists for example of a hard drive, a USB key, a compact disk (CD or DVD), etc.

The computer system 100 further comprises read-write memory 106. The read-write memory 106 is preferably volatile memory. It consists for example of Random Access Memory (RAM).

A source code 108 is saved in the mass storage 104. The source code 108 comprises lines of code written in a predefined programming language, i.e. observing the syntax of this programming language. In the example described, the programming language is C++ language.

In the example described, the source code 108 is as follows:

```
void example_compilation(int N) {
    Array A = f1( );
    Array B = f2( );
    Array C = conj(A) + B;
    Array D = A − B;
    Array E = C > D; }
```

A compiling computer program, hereinafter referred to as a compiler 110, is saved in the mass storage 104 and intended to be loaded in the read-write memory 106 to be executed by the processor 102.

The compiler 110 is designed to convert the source code 108 into machine code intended to be executed by a processor of a computer system, referred to as the target computer system 112. In the example described, the target computer system 112 is different from the computer system 100. Alternatively, the target computer system could be the computer system 100. The target computer system 112 particularly comprises a processor 114 (for example, a sequencing microcontroller) for executing the machine code and a specialised electronic device 116 (for example a coprocessor or an accelerator) specialized for carrying out the array computations, as explained hereinafter. Moreover, the specialised electronic device 116 comprises a memory 118, wherein the simplified electronic device 116 is intended to write the array computation result.

In the example described, the specialised electronic device 116 is intended to carry out each of a plurality of array computations from a predefined list, annotated (L).

In the example described, the specialised electronic device 116 is intended to carry out array computations in compliance with a predefined array operation expression, annotated (Exp). An expression is a correctly formed (i.e. in compliance with mathematical rules), and preferably finite, combination of symbols. Some symbols, referred to as array symbols, represent arrays, referred to as expression input arrays, based on which the expression is evaluated, whereas other symbols, referred to as operation symbols, each represent an operation on one or a plurality of input arrays. Preferably, each symbol represents an operation taken from a predefined list.

In the example described, the predefined expression (Exp) is:

(Exp): op1 (op2 (op3 (A), op4 (B)))

where op1, op2, op3 and op4 are operation symbols, and A and B are input arrays.

In the example described, the list of operations of each operation symbol comprises one or a plurality of operations: addition, opposite, conjugation, inverse, multiplication, transposition, etc.

An array computation according to the predefined expression above is for example:

inverse(−A+conjugate(B))

In this example, the first operation symbol op1 corresponds to the inverse operation, the second operation symbol op2 corresponds to the addition operation, the third operation symbol op3 corresponds to the opposite operation and op4 corresponds to the conjugation operation.

The compiler 110 comprises a pre-compiler 120 and a main compiler 122.

The pre-compiler 120 is designed to modify the source code in order to supply a modified source code, again in compliance with the programming language (C++ language in the example described). The modifications made by the pre-compiler 112 will be detailed during the description of FIG. 2.

The main compiler 122 is designed to convert the modified source code into machine code intended to be executed by the processor 114 of the target computer system 112. In the example described, the main compiler 122 is the MB C++ compiler.

A data processing library 124 is also saved in the mass storage 104.

The data processing library 124 firstly comprises a definition of an "array" data structure, and indicated in the source code by the term "array". An array is designed to contain a number of data items of the same type (preferably, at least two data items), organised in columns and rows. For example, an array may contain complex numbers. The definition is used by the main compiler 122 to convert the arrays appearing the source code, and particularly the array declarations, into the corresponding machine code.

In the example described, the definition of the "Array" data structure is designed such that the machine code generated by the main compiler 122 when the latter encounters an array declaration, does not comprise an instruction for allocating read-write memory to the array, i.e. it does not comprise an instruction for reserving memory space intended to contain the array data. The memory allocation will be performed by further means detailed hereinafter.

The definition further defines an assigning operation for arrays, suitable for assigning array type data to an array. In the example described, the standard C++"=" operation is adapted to enable this assigning.

The library 124 further comprises machine code executable on the target computer system of the functions detailed hereinafter.

int max_sz (int_1, int_2)

This consists of a function named max_sz awaiting two integers, int_1 and int_2, as arguments, and returning an integer type result. This function is designed to, during the execution thereof, return the greatest argument as a result.

void ra_init_size (array_1, int_1, int_2)

This consists of a function named ra_init_size awaiting an array, array_1, and two integers, int_1 and int_2, as arguments, and which does not return any result. This function is designed to, during the execution thereof, allocate a memory space, in the memory 118 of the target computer system 112, to the array sent as an argument, having a size, i.e. number of rows and columns, of the second and third arguments respectively.

void ra_array_prim_core(array_1, int_1, int_2, int_3, array_2, int_4, array_3)

This consists of a function named ra_array_prim_core which is intended to be compiled in instructions which, when executed by the processor 114 of the target computer system 116, commands the specialised electronic device 116, so that the latter carries out one of the array computations.

In the example described, the arguments sent to the function indicate the array computation to be carried out thereto.

In this way, in the example described, the function ra_array_prim_core awaits, as arguments, arrays corresponding to the input arrays of the predefined expression.

In the example described, the function ra_array_prim_core further awaits as arguments, for each operation symbol appearing in the predefined expression, a variable indicating the operation from the associated list to which the operation symbol corresponds. These arguments will hereinafter be referred to as "operation identifiers" of the function ra_array_prim_core.

The function ra_array_prim_core further awaits a further array as an argument, wherein the array computation result is intended to be saved. This array will hereinafter be referred to as a "result array".

In this way, in the example described, the function ra_array_prim_core awaits three arrays, named array_1, array_2 and array_3, as arguments. The variable array_1 contains the result array. The variables array_2 and array_3 contain the input arrays. The function ra_array_prim_core further awaits four integers, named int_1, int_2, int_3 and int_4. These variables contain the operation identifiers of the four computing operations to be carried out.

Moreover, the function ra_array_prim_core is written to consider an array only containing a single data item (array with a single row and a single column) as an array having a suitable size for the array operation performed on this array, all the locations of the array containing the same number. In this way, the array operation A+[1], where [1] is an array only containing the number 1, will be considered by the function ra_array_prim_core as the addition of the array A with an array of identical size wherein each of the locations contains the number 1, such that the previous array computation returns to add the number 1 to all the items of the array A.

In the example described, the function ra_array_prim_core is intended to be compiled in instructions which, when executed by the processor 114, send to the specialised electronic device 116 the input arrays and the array operations of the array computation, so that the specialised electronic device 116 carries out the array computation.

With reference to FIG. 2, an example of a compiling method 200 according to the invention, implemented by the computer system 100 in FIG. 1, is described hereinafter.

During a step 202, the compiler 110 is loaded in the read-write memory 106 and executed by the processor 102.

Hereinafter, when stating that the compiler 110 carries out a certain action, this will means that the processor 102, executing the instructions of the compiler 110, carries out this action.

During a step 204, the pre-compiler 112 searches for the lines comprising a combination of a plurality of array operations. In the example described, the pre-compiler finds the line marked in bold type:

```
void example_compilation(int N) {
    Array C = conj(A) + B;
    Array D = A – B;
    Array E = C > D; }
```

During a step 206, for each line found in the step 204, the pre-compiler 112 splits the combination of array operations over a plurality of lines. For this purpose, the pre-compiler 112 replaces the line found by the same number of replacement lines as array operations in the line found. Each replacement line comprises one of the respective array operations and an array declaration and an assignment of the array operation result to the array. In the example described, the source code following the step 206 is thus as follows, the modified or added lines being displayed in bold type:

```
void example_compilation(int N) {
    Array A = f1( );
    Array B = f2( );
    Array var_op_750 = conj(A);
    Array C = var_op_750 + B;
    Array D = A – B;
    Array E = C > D; }
```

During a step 208, the pre-compiler searches for the lines comprising an array declaration followed, on the same line, by assigning an array type value to the array, for example assigning the result of an array operation to the array. In the example described, the compiler finds the lines shown in bold type:

```
void example_compilation(int N) {
    Array A = f1( );
    Array B = f2( );
    Array var_op_750 = conj(A);
    Array C = var_op_750 + B;
    Array D = A – B;
    Array E = C > D; }
```

During a step 210, the pre-compiler 112 splits each line found in the step 208 into a line only comprising the array declaration, and a line only comprising the assignment of the value of the array.

In the example described, the modified or added lines are shown in bold type:

```
void example_compilation(int N) {
    Array A;
    A = f1( );
    Array B;
    B = f2( );
    Array var_op_750;
    var_op_750 = conj(A);
    Array C;
    C = var_op_750 + B;
    Array D;
    D = A − B;
    Array E;
    E = C > D; }
```

Hereinafter, assigning the result of an array operation for which no argument is itself the result of an array operation to an array will be referred to as an "elementary array operation".

The instructions var_op_750=conj (A) and D=A−B are for example elementary array operations, but not instructions A=f1 ( ) and B=f2 ( ).

During a step 212, the pre-compiler 112 determines, in the source code, the presence of one or a plurality of array computations on or a plurality of input arrays, and for which the result is assigned to a result array.

In the example described, the array computation(s) are flagged in that they each belong to the predefined list (L) of array computations.

In the example described, the array computations from the predefined list (L) are those complying with the predefined expression (Exp).

In the example described, since, after the step 210, the source code only comprises elementary array operations, each array computation extends over one or a plurality lines, referred to as array computation lines. The set of this or these array computation lines is referred to as an array computation block. In this way, each array computation block contains one or a plurality of written lines to carry out an array computation on one or a plurality of input arrays and to assign the result of the array computation in a result array.

In the example described, the pre-compiler 112 thus determines three array computation blocks: a first array computation block comprising the lines var_op_750=conj (A) and C=var_op_750+B (carrying out the array computation "conj (A)+B"), a second array computation block comprising the line D=A−B (carrying out the array computation "A−B"), and a third array computation block comprising the line E=C>D (carrying out the array computation "C>D").

As explained hereinafter, the pre-compiler 112 will modify the source code according to the array computation(s) for which the presence has been determined.

During a step 214, for each array computation block, the pre-compiler 112 inserts lines in the source code instead of the array computation line(s) of the array computation block.

The step 214 comprises the following steps 216 to 224.

During a step 216, the pre-compiler 112 determines and inserts, in the source code, for each array computation for which the presence has been determined, one or a plurality of lines of code, referred to as size computation lines, intended to be compiled in instructions, which, when executed by the processor 114, compute the dimensions of the result array on the basis of at least one of the dimensions of at least one input array.

The step 216 comprises the following steps 218 to 220.

During a step 218, for each array computation, the pre-compiler 112 identifies the input arrays and the array operations making up the array computation.

In this way, for example, for the array computation "conj (A)+B", the pre-compiler 112 identifies the arrays A and B as the input arrays of the array expression and the addition, conjugation and identity operations as the array operations of the array computation.

During a step 220, for each array computation, the pre-compiler 112 determines, on the basis of the array operations identified in the step 218, one or a plurality of functions, referred to as size computation functions, these functions being written to compute the dimensions of the result array on the basis of at least one dimension of one of the input arrays.

In the example described, for the array computation "conj (A)+B", the pre-compiler 112 determines that the number of columns of the result array c is equal to the greater among the number of columns of the input array A and the number of columns of the input array B (since the arrays A and B may be arrays with a single item, as explained above), and that the number of rows of the result array C is equal to the greater among the number of rows of the input array A and the number of rows of the input array B. In this way, in the example described, the pre-compiler 112 determines the function max_sz (A.p_nr, B.p_nr) for computing the number of rows of the result array, and the function max_sz (A.p_nc, B.p_nc) for calculating the number of columns of the result array.

In this way, the size computation lines firstly comprise the declaration of one or a plurality of variables, referred to as dimension variables, intended to contain the number of rows and columns of the result array.

In the example described, the dimensioning lines comprise a declaration of a first integer, named dup_52_nr in the code, intended to contain the number of rows of the result array, and a declaration of a second integer, named dup_52_nc in the code, intended to contain the number of columns of the result array.

The size computation lines further comprises the call(s) of the function(s) for computing the result array determined in the step 220. The size computation lines further comprise one or more assignments of the results of the function(s) for computing the dimensions of the result array to the dimension variable(s) of the result array.

In the example described, for the array computation "conj (A)+B", the size computation lines inserted are thus:
int dup_52_nr;
int dup_52_nc;
dup_52_nr=max_sz(A.p_nr, B.p_nr);
dup_52_nc=max_sz(A.p_nc, B.p_nc);

During a step 222, the pre-compiler 112 determines and inserts, in the source code, for each array computation for which the presence has been determined, one or a plurality of lines of code, referred to as allocation lines, intended to be compiled in instructions, which, when executed by the processor 114, allocate a memory space to the result array based on the computed dimensions of the result array.

In the example described, the allocation line comprises a call for the array initialisation primitive ra_init_size, to which the result array of the array computation and the dimension variable(s) of the result array are sent as arguments.

In the example described, for the first array computation block, the allocation line is as follows:
ra_init_size(C, dup_52_nr, dup_52_nc);

During a step 224, the pre-compiler 112 determines and inserts, in the source code, for each array computation for which the presence has been determined, one or a plurality of lines of code, referred to as command lines, intended to be compiled in instructions, which, when executed by the processor 114, command the specialised electronic device 116, so that the latter carries out the array computation.

In the example described, the command line(s) are intended to be compiled in instructions which, when executed by the processor 114, send to the specialised electronic device 116 the input arrays and the array operations of the array computation.

In the example described, the command line comprises a call for the primitive ra_array_prim_core, to which the result array, the input arrays and the array computation operations are sent as arguments.

In the example described, for the first array computation block, the primitive call line of code is:
ra_array_prim_core(C, " ", "operator+", "conj", A, "nulcfg", B);

In this way, in the example described, the source code following the step 214 is as follows, the added or modified lines being shown in bold type:

```
void example_compilation (int N) {
Array A;
ra_f1(A);
Array B;
ra_f2(B);
Array C;
int dup_52_nr;
int dup_52_nc;
dup_52_nr = max_sz(A.p_nr, B.p_nr);
dup_52_nc = max_sz(A.p_nc, B.p_nc);
ra_init_size(C, dup_52_nr, dup_52_nc);
ra_array_prim_core(C, "", "operator+", "conj", A,
"nulcfg", B);
Array D;
int dup_53_nr;
int dup_53_nc;
dup_53_nr = max_sz(A.p_nr, B.p_nr);
dup_53_nc = max_sz(A.p_nc, B.p_nc);
ra_init_size(D, dup_53_nr, dup_53_nc);
ra_array_prim_core(D, "", "operator+", "nulcfg", A,
"opp", B);
Array E;
int dup_54_nr;
int dup_54_nc;
dup_54_nr = max_sz(A.p_nr, B.p_nr);
dup_54_nc = max_sz(A.p_nc, B.p_nc);
ra_init_size(E, dup_54_nr, dup_54_nc);
ra_array_prim_core(E, "", "operator>", "nulcfg", C,
"nulcfg", D); }
```

During a step 226, the pre-compiler 112 simplifies the lines of source code and in particular the lines inserted in the step 214.

In this way, during the steps 214 and 226, the lines determined in the step 214 (size computation, allocation and command line) and simplified in the step 226 were inserted in the source code.

In the example described, a plurality of simplifying steps are carried out during the step 226.

During a step 228, the pre-compiler 112 searches, particularly in the inserted lines, for the assignment of the same expression to two different variables. The expression is for example a call for a function, the result whereof is thus assigned to the two variables.

In the example described, the pre-compiler 112 finds the following lines shown in bold type:

```
void example_compilation (int N) {
Array A;
ra_f1(A);
Array B;
ra_f2(B);
Array C;
int dup_52_nr;
int dup_52_nc;
dup_52_nr = max_sz(A.p_nr, B.p_nr);
dup_52_nc = max_sz(A.p_nc, B.p_nc);
ra_init_size(C, dup_52_nr, dup_52_nc);
ra_array_prim_core(C, "", "operator+", "conj", A,
"nulcfg", B);
Array D;
int dup_53_nr;
int dup_53_nc;
dup_53_nr = max_sz(A.p_nr, B.p_nr);
dup_53_nc = max_sz(A.p_nc, B.p_nc);
ra_init_size(D, dup_53_nr, dup_53_nc);
ra_array_prim_core(D, "", "operator+", "nulcfg", A,
"opp", B);
Array E;
int dup_54_nr;
int dup_54_nc;
dup_54_nr = max_sz(A.p_nr, B.p_nr);
dup_54_nc = max_sz(A.p_nc, B.p_nc);
ra_init_size(E, dup_54_nr, dup_54_nc);
ra_array_prim_core(E, "", "operator>", "nulcfg", C,
"nulcfg", D); }
```

During a step 230, the pre-compiler 112 removes the assignment of a first of the two variables and replaces, in the source code, this first variable by the second variable. The pre-compiler 112 also removes the declaration of the first variable.

In the example described, the source code following the step 230 is thus as follows:

```
void example_compilation (int N) {
Array A;
ra_f1(A);
Array B;
ra_f2(B);
Array C;
int dup_52_nr;
int dup_52_nc;
dup_52_nr = max_sz(A.p_nr, B.p_nr);
dup_52_nc = max_sz(A.p_nc, B.p_nc);
ra_init_size(C, dup_52_nr, dup_52_nc);
ra_array_prim_core(C, "", "operator+", "conj", A,
"nulcfg", B);
Array D;
ra_init_size(D, dup_52_nr, dup_52_nc);
ra_array_prim_core(D, "", "operator+", "nulcfg", A,
"opp", B);
Array E;
ra_init_size(E, dup_52_nr, dup_52_nc);
ra_array_prim_core(E, "", "operator>", "nulcfg", C,
"nulcfg", D); }
```

The steps 228 and 230 thus make it possible to reduce the number of assignments of the source code. If the expression is a call for a function, these steps also make it possible to remove the calls for redundant functions of the source code. These steps also make it possible to reduce the number of variables used.

During a step 232, the pre-compiler 112 searches for a combination of calls for functions associated with one of a plurality of predefined simplifying rules. One simplifying rule associated with the combination max_sz (max_sz(a, 1), b) is for example: max_sz (max_sz(a, 1), b)=max_sz(a, b).

During a step 234, the pre-compiler 112 simplifies each combination found according to the associated simplifying rule.

In the example described, the source code following the step 234 is as follows:

```
void example_compilation (int N) {
  Array A;
  ra_f1(A);
  Array B;
  ra_f2(B);
  Array C;
  int dup_52_nr;
  int dup_52_nc;
  dup_52_nr = max_sz(A.p_nr, B.p_nr);
  dup_52_nc = max_sz(A.p_nc, B.p_nc);
  ra_init_size(C, dup_52_nr, dup_52_nc);
  ra_array_prim_core(C, "", "operator+", "conj", A,
    "nulcfg", B);
  Array D;
  ra_init_size(D, dup_52_nr, dup_52_nc);
  ra_array_prim_core(D, "", "operator+", "nulcfg", A,
    "opp", B);
  Array E;
  ra_init_size(D, dup_52_nr, dup_52_nc);
  ra_array_prim_core(E, "", "operator>", "nulcfg", C,
    "nulcfg", D); }
```

During a step 236, the pre-compiler 112 supplies the main compiler 114 with the modified source code.

During a step 238, the main compiler 114 compiles the source code supplied in the step 236, in machine code intended to be executed by the target computer system 112.

In particular, the command line(s) are compiled in instructions which, when executed by the processor 114, command the specialised electronic device 116, so that the latter carries out the array computation.

In the example described, the command line(s) are compiled in instructions which, when executed by the processor 114, send the specialised electronic device 116 the input arrays and the array operations of the array computation.

The invention is not limited to the examples of embodiment described above, but on the contrary defined by the claims hereinafter.

It will indeed be obvious to those skilled in the art that various modifications may be made to the examples of embodiments described above, in the light of the teaching disclosed herein.

In particular, the array computations that the array computation primitive is suitable for computing could comply with a further predefined expression, for example: op1(op2(A), op3(op4(B), op5(C))), such that the following lines:

D=A−B;

E=C>D;

would form an array computation block corresponding to the array computation: E=C>A−B.

In this case, the operation symbol op1 would correspond to the > operation, the operation symbol op2 would correspond to the identity operation, the operation symbol op3 would correspond to the + operation, the operation symbol op4 would correspond to the identity operation and the operation symbol op5 would correspond to the opposite operation.

Furthermore, in the claims hereinafter, the terms used should not be interpreted as limiting the claims to the features of the examples of embodiments described above, but should be interpreted to include any equivalent that can be envisaged by those skilled in the art by applying their general knowledge.

The invention claimed is:

1. A compiling method that comprises:
   pre-compiling a source code written in a programming language and comprising code lines, the pre-compiling comprising:
      determining, in the source code, the presence of one or a plurality of array computations on one or a plurality of arrays, referred to as input arrays, the result whereof is assigned to an array, referred to as a result array, the array computation(s) each belonging to a predefined list of array computations each comprising at least two array operations, the array computations from the predefined list being array computations according to a predefined expression which is a finite and syntactically correct combination of operation symbols, each representing an array operation taken from a predefined list, and array symbols, each representing an input array,
      modifying the source code according to the array computation(s) for which the presence has been determined, this modification comprising:
         inserting, in the source code, instead of each array computation for which the presence has been determined, one or a plurality of lines of code, referred to as command lines,
   compiling the source code modified during the pre-compiling method in machine code intended to be executed by a computer system, referred to as a target computer system, having a processor and a specialised electronic device different to the processor and specialized to carry out each of the array computations from the predefined list, and in particular, the array computation for which the presence has been determined, the compiling of the modified source code comprising:
      compiling the command lines:
         in instructions which, when executed by the processor of the target computer system, send the specialised electronic device the input arrays and the array operations of the array computation, and
         in instructions which, when executed by the processor of the target computer system, command the specialised electronic device, so that the specialised electronic device carries out the array computation.

2. The compiling method according to claim 1, wherein modifying the source code comprises:
   determining, for each array computation for which the presence has been determined, one or a plurality of lines of code, referred to as size computation lines, intended to be compiled in instructions, which, when executed by the processor, compute the dimensions of the result array on the basis of at least one of the dimensions of at least one input array.

3. The compiling method according to claim 2, wherein the pre-compiling further comprises:
   simplifying the size computation line(s) to reduce the number of functions and/or variables present in these lines, the simplified lines being inserted in the source code.

4. The compiling method according to claim 3, wherein simplifying the size computation line(s) comprises:
   determining, in the size computation line(s), the assignment of the same expression to two different variables,
   removing the assignment of a first of the two variables and replacing, in the size computation line(s), the first variable by the second of the two variables.

5. The compiling method according to claim 4, wherein simplifying the size computation line(s) comprises:
   determining the presence, in the size computation line(s), of a combination of calls of functions of at least one dimension of at least one input array,
   simplifying the combination of function calls based on predefined rules for simplifying function call combinations.

6. The compiling method according to claim 4, wherein modifying the source code comprises:
   determining, for each array computation for which the presence has been determined, one or a plurality of lines of code, referred to as allocation lines, intended to be compiled in instructions, which, when executed by the processor, allocate a memory space to the result array based on the computed dimensions of the result array.

7. The compiling method according to claim 3, wherein simplifying the size computation line(s) comprises:
   determining the presence, in the size computation line(s), of a combination of calls of functions of at least one dimension of at least one input array,
   simplifying the combination of function calls based on predefined rules for simplifying function call combinations.

8. The compiling method according to claim 7, wherein modifying the source code comprises:
   determining, for each array computation for which the presence has been determined, one or a plurality of lines of code, referred to as allocation lines, intended to be compiled in instructions, which, when executed by the processor, allocate a memory space to the result array based on the computed dimensions of the result array.

9. The compiling method according to claim 3, wherein modifying the source code comprises:
   determining, for each array computation for which the presence has been determined, one or a plurality of lines of code, referred to as allocation lines, intended to be compiled in instructions, which, when executed by the processor, allocate a memory space to the result array based on the computed dimensions of the result array.

10. The compiling method according to claim 2, wherein modifying the source code comprises:
    determining, for each array computation for which the presence has been determined, one or a plurality of lines of code, referred to as allocation lines, intended to be compiled in instructions, which, when executed by the processor, allocate a memory space to the result array based on the computed dimensions of the result array.

11. The compiling method according to claim 10, wherein a memory space for the result array is allocated in a memory of the specialised electronic device, the latter being intended to write the result of the array computation in the allocated memory space.

12. A computer program embodied in a non-transitory storage medium comprising instructions which, when executed by a computer system processor, give rise to the implementation of a compiling method according to claim 1.

13. A computer system comprising:
    a processor,
    a read-write memory, and
    mass storage wherein a computer program according to claim 12 intended to be loaded in the read-write memory to be executed by the processor.

14. The compiling method according to claim 1, wherein the predefined expression is:
    op1(op2(op3(A), op4(B)))
    where op1, op2, op3 and op4 are operation symbols, and A and B are array symbols.

15. The compiling method according to claim 1, wherein the predefined list of array operations comprises one or a plurality of the following operations: addition, opposite, conjugation, inverse, multiplication and transposition.

* * * * *